UNITED STATES PATENT OFFICE.

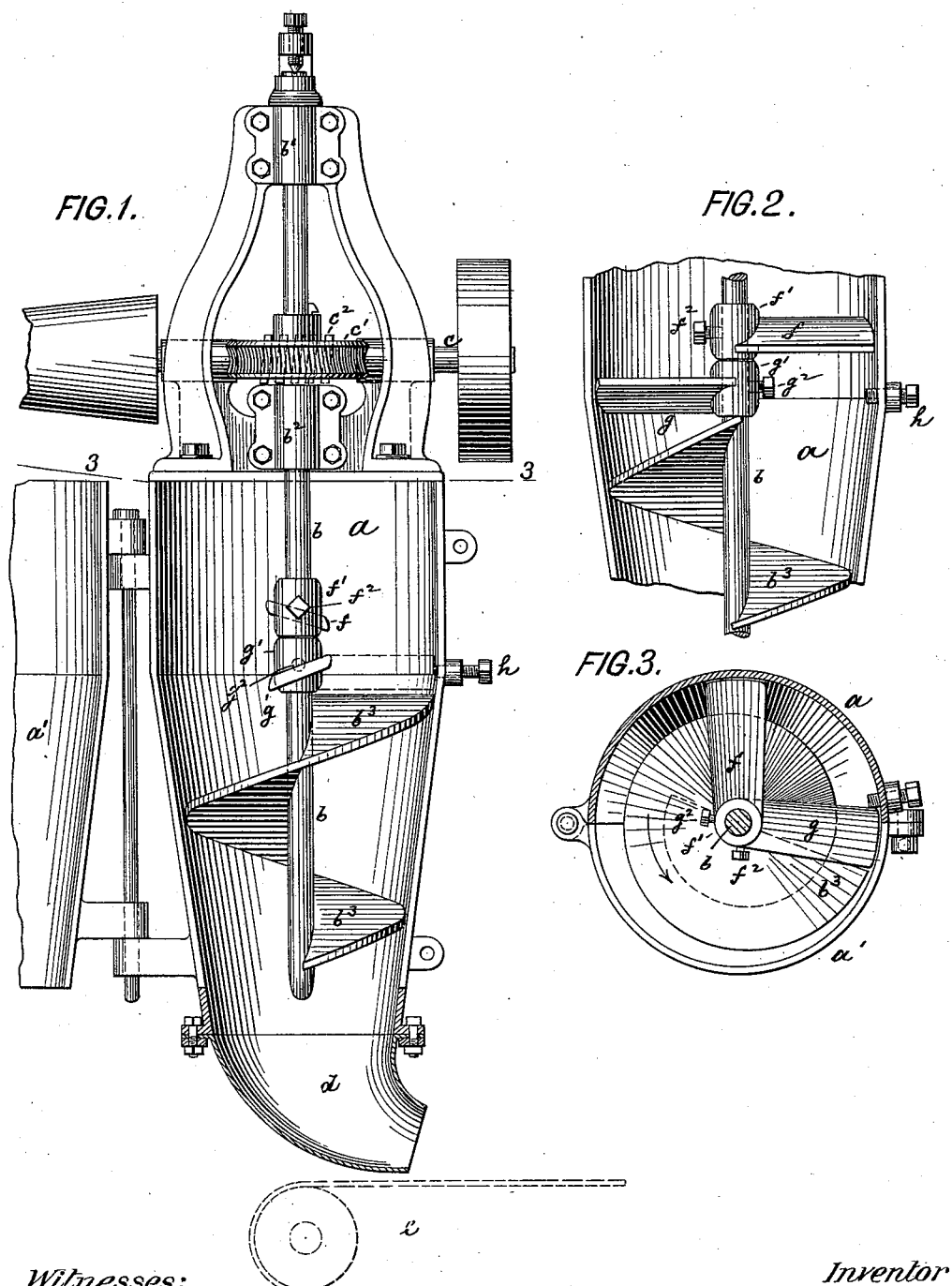

FRITZ DÜHRKOP, OF NEW YORK, N. Y.

MACHINE FOR SHAPING DOUGH.

SPECIFICATION forming part of Letters Patent No. 540,963, dated June 11, 1895.

Application filed November 5, 1894. Serial No. 527,872. (No model.)

*To all whom it may concern:*

Be it known that I, FRITZ DÜHRKOP, of New York city, New York, have invented a new and useful Improvement in Machines for Shaping Dough, of which the following is a specification.

This invention relates to an improved machine for shaping dough, and more particularly to the mechanism for causing the dough to be grasped by the conveyer screw within the feed cylinder.

In the accompanying drawings, Figure 1 is an elevation, partly in section, of my improved machine for shaping dough. Fig. 2 is an elevation of the blades or stops, taken at right angles to Fig. 1; and Fig. 3 is a cross-section on line 3 3, Fig. 1.

The machine consists of a tapering shell or casing $a$, into the upper end of which the dough is introduced, and which is provided preferably with a hinged lid $a'$, so that it may be opened and cleaned. Through the shell $a$, extends a central shaft $b$, journaled in bearings $b'$, $b^2$, and revolved from power shaft $c$, by worm gear $c'$, $c^2$. The shaft $b$, is encircled at its lower end by the conveyer screw $b^3$, which forces the dough through a nozzle $d$, and upon a feed apron $e$, to be cut up into dough loaves or rolls.

It frequently happens that the dough becomes clogged or stuck within the upper part of the cylinder, when it will not be grasped by the upper edge of the conveyer screw. To remedy this defect, I secure to the shaft $b$, above the screw $b^3$, a beveled cutting blade $f$, by means of an encircling hub $f'$, and a binding screw $f^2$. This blade is carried around with the shaft and will divide the dough, and force it down upon the conveyer. The blade $f$, is of particular service where thick or heavy dough is being worked, but in cases where thin dough is being used, a fixed stop should be provided, which checks the tendency of the dough to revolve with the conveyer screw, in lieu of being fed downward. To effect this result, I secure to the shaft $b$, beneath the blade $f$, a second beveled blade $g$, by means of hub $g'$, and binding screw $g^2$. In line horizontally with the blade $g$, the shell $a$, is perforated for the reception of a horizontally movable stop or screw $h$, adapted to be projected into the shell. When heavy dough is being operated upon, both blades $f$, $g$, are keyed to the shaft $b$, to cut the dough and force it into contact with the conveyer in the manner described; but when thin dough is being worked, the screw $g^2$, is slackened, the blade $g$, is brought opposite to the stop $h$, and the latter is projected into the shell $a$, to form an abutment for the outer end of the blade. Thus the blade $g$, becomes fixed and constitutes a stop or bridge which checks the tendency of the dough to revolve, and forces it down into contact with the conveyer.

It will be seen, that with my invention, the dough is always brought into contact with the conveyer, and that the latter is prevented from running light, or feeding an uneven amount of dough through the nozzle and upon the apron.

What I claim is—

A dough shaping machine composed of a shell, a shaft, a conveyer screw, an inclined blade having a hub that engages and may be secured to the shaft, and a stop passing through the shell and adapted to engage the outer end of the blade, all being so constructed that the blade may be released from the shaft and connected to the shell, or connected to the shell and released from the shaft, substantially as specified.

FRITZ DÜHRKOP.

Witnesses:
WILLIAM SCHULZ,
F. V. BRIESEN.